(12) United States Patent
Bahl et al.

(10) Patent No.: US 6,664,319 B1
(45) Date of Patent: Dec. 16, 2003

(54) RUBBER COMPOUND FOR GOLF BALL AND GOLF BALL

(75) Inventors: Virendra Kumar Bahl, St. Marys (AU); Steven Joseph Fisher, Rosemeadow (AU)

(73) Assignee: Waggle Pty LTD, Melbourne (AU)

( * ) Notice: Subject to any disclaimer, the term of this patent is extended or adjusted under 35 U.S.C. 154(b) by 0 days.

(21) Appl. No.: 09/701,952

(22) PCT Filed: Jun. 4, 1999

(86) PCT No.: PCT/AU99/00435

§ 371 (c)(1),
(2), (4) Date: Sep. 26, 2001

(87) PCT Pub. No.: WO99/64511

PCT Pub. Date: Dec. 16, 1999

(30) Foreign Application Priority Data

Jun. 5, 1998 (AU) .............................................. PP 3958

(51) Int. Cl.⁷ .......................... A63B 37/06; C08K 3/04; C08L 15/02
(52) U.S. Cl. .................. 524/322; 524/423; 524/447; 524/488; 525/332.3; 525/332.4; 473/372; 473/377
(58) Field of Search ................................ 524/322, 423, 524/447, 488; 525/332.4, 332.3; 473/372, 377

(56) References Cited

U.S. PATENT DOCUMENTS

| 4,136,219 | A | * | 1/1979 | Odam | |
| 4,955,966 | A | | 9/1990 | Yuki et al. | .................. 273/218 |
| 5,209,485 | A | * | 5/1993 | Nesbitt | |
| 5,763,333 | A | * | 6/1998 | Suzuki | |

FOREIGN PATENT DOCUMENTS

| AU | 68600/81 | | 10/1981 |
| EP | 0 294 181 | | 12/1988 |
| EP | 0 314 416 | | 5/1989 |
| EP | 610552 | * | 8/1994 |
| EP | 0 711 642 | | 5/1996 |
| EP | 0 955 335 | | 11/1999 |
| JP | 04-283253 | * | 10/1992 |
| JP | 08-020693 | * | 1/1996 |

OTHER PUBLICATIONS

Derwent Abstract Accession No. 94–355487/44, KR 9312054 B (Kim H), Dec. 23, 1993, one page.

International Search Report dated Jul. 1, 1999 for PCT/AU99/00435, 4 pps.

* cited by examiner

*Primary Examiner*—David J. Buttner
(74) *Attorney, Agent, or Firm*—Ohlandt, Greeley, Ruggiero & Perle LLP

(57) ABSTRACT

A golf ball is provided that includes a molded resilient inner core made of a rubber compound and a polymeric cover surrounding the inner core. The rubber compound is a halo-butyl rubber polymer and a carbon black filler in an amount of 80% to 100% by weight of the total rubber component.

21 Claims, No Drawings

RUBBER COMPOUND FOR GOLF BALL AND GOLF BALL

This invention relates to a rubber formulation and a rubber compound which is suitable for use in making golf balls. This invention also extends to a golf ball having an inner core made of the rubber compound.

This invention relates particularly but not exclusively to a golf ball for use in playing a compact indoor golf game and it will be convenient to describe it with reference to this example application. However it is to be clearly understood that the invention is not limited to its use in an indoor golf game and in fact the rubber compound and the ball could be used in a myriad of other applications including being used in outdoor golf.

The game of golf is a very popular game and its popularity is constantly increasing. This has meant a strong demand for facilities to play the game of golf. However the area of land occupied by standard golf courses is considerable and thus in many environments and locations it may be difficult to construct a full length 18 hole golf course. Further if golf courses are constructed outside of cities and in the country, it may be difficult and time consuming for prospective golf players to get to the course for a game. Further the weather conditions in many countries of the world prevent golf being played on normal outdoor courses for many months of the year.

Accordingly there is potentially a huge demand for an indoor game of golf which can be located in densely populated areas with little space for sports facilities. There may also be a demand for a compact game of golf played on an outdoor course of reduced scale.

The applicant has already developed a compact golf game which is disclosed in its international patent application no. PCT/AU90100398. The entire contents of this specification are explicitly incorporated into this document by cross reference. The game involves hitting a ball from a tee area against a rebound wall from where it rebounds to a green area positioned intermediate the tee and the rebound wall. The rebound distance of the ball is a function of the impact characteristics of the ball on the wall, eg velocity and trajectory of the golf ball. The wall is rigid and it is the ball which is specially designed to lose kinetic energy when it strikes the wall. This has the effect that the ball does not rebound as far as a standard golf ball and makes the game suitable for playing indoors.

For the game to have lasting appeal and to reproduce the challenge of the great game of golf, it is obviously very important that the result of any golf shot reflects the skill of a player and the quality of any golf shot. It is also desirable that the ball have the look and feel of a standard golf ball and create the same feel as a standard golf ball when struck by a golf club.

Previously the applicant used a ball having a resilient hollow inner ball, eg like a squash ball, surrounded by a hard coating which is hard like a standard golf ball but which is still capable of considerable deformation.

However this ball tends to get too hot, especially in warm conditions, and when this happens the ball bounces too much off the walls. This has the potential to turn an indifferent golf shot into a good result and therefore detracts from the quality of the game. Further the crisp feel of golf ball on club which occurs with a normal golf ball, diminishes over time with the applicant's ball.

Accordingly it would be advantageous if a ball could be found which did not suffer from the shortcomings of the existing ball. The applicant searched extensively for a ball which would meet its requirements but was unsuccessful. Further applicant approached golf ball manufacturers with a view to having a golf ball manufactured but was unsuccessful. Thus it had to take the initiative of guiding and procuring the development of a new ball.

According to an aspect of this invention there is provided a rubber compound including a rubber component comprising essentially halo-butyl rubber polymer; and carbon black in an amount of between 80% and 100% by weight of the rubber component.

A halo-butyl rubber polymer has been found to be suitable because it has a low rebound co-efficient or resilience, particularly at temperatures 5° C. to 40° C. This is a necessary property of golf balls produced for the applicant's game because the game is played in a compact space and the rebound distance has to be significantly lower than with a standard golf ball. That is, significant energy must be absorbed from the golf ball during impact.

Preferably the halo-butyl rubber polymer is chloro-butyl or bromo-butyl polymer.

Preferably the filler is N220 carbon black or N339 carbon black.

Carbon black is a reinforcing filler and in addition has the effect of modifying the hardness, resilience, and other physical properties of the rubber compound.

Preferably the carbon black comprises 83 to 87% by weight of the total rubber component, or preferably 85 to 95% by,weight, most preferably 88 to 92% by weight, e.g. about 90% by weight.

The rubber compound may include at least one further filler, eg barytes and/or kaolin.

According to another aspect of this invention there is provided a rubber formulation for forming a resilient rubber compound, the formulation including:
  a rubber component comprising essentially halo-butyl rubber polymer;
  carbon black in an amount of between 80% and 100% by weight of the rubber component; and homogenisation means for distributing the carbon black homogeneously within the rubber component.

The halo-butyl rubber polymer may include any one of more of the preferred features described above with reference to the first aspect of the invention. Similarly the carbon black may have any one or more of the preferred features described above with reference to the first aspect of the invention.

For example the halo-butyl rubber polymer may be a chloro-butyl or bromo-butyl polymer and the filler may be carbon black, eg. N220 or N339.

Typically the formulation further includes vulcanising agents for vulcanising the rubber formulation during the processing thereof to form rubber. These vulcanising agents may include zinc oxide and/or a sulphur compound such as disulphide, eg accelerants such as tetramethylthiuramdisulphide and 2,2 dithiobisbenzothiazole.

The vulcanising agents facilitate crosslinking of the polymer chains, eg by sulphur bridges.

The homogenising means may also include STRUTKOL 40 MS which facilitates mixing of all components into the polymer.

The formulation may also include means for facilitating mixing and moulding of the formulation, eg a blend of fatty acids and stearic acid. Yet further the mixing and moulding means may include a paraffinic or naphthenic oil, eg PROPAR. The oils assist in mixing the formulation.

The formulation may also include micro-crystalline wax which assists in mixing.

According to yet another aspect of this invention there is provided a moulded resilient inner core for a golf ball, the core including a rubber compound including a rubber component comprising essentially halo-butyl rubber polymer, and a filler which is carbon black.

The carbon black may be present in an amount of between 80% and 100% by weight of the rubber component.

The halo-butyl polymer and the filler may include any one or more of the preferred features as described above with respect to the first aspect of the invention.

According to yet another aspect of this invention there is provided a golf ball which includes:

a moulded resilient inner core- made of a rubber compound including a halo-butyl rubber polymer and a filler which is carbon black, and a polymeric cover surrounding the inner core.

The polymer and the filler of the inner core may include any one or more of the preferred features as described above with reference to the first aspect of the invention.

The cover is typically dimpled and has thickness and other properties comparable to the cover of a conventional golf ball. The golf ball has similar dimensions to a conventional golf ball and has an external appearance which resembles that of a conventional golf ball.

In a preferred form the polymer of the core is chloro-butyl or bromo-butyl polymer and the filler is carbon black, eg N220 or N339.

Preferably the cover is an ionomeric polymer compound, eg. SURYLYN.

According to yet another aspect of this invention there is provided a process for making a golf ball, the process including:

providing a rubber formulation including a butyl polymer and at least one filler for modifying the resilience of the polymer;

mixing the formulation to distribute the filler homogeneously through the polymer;

passing the formulation through an open mill mixer to form sheeting; and extruding the rubber through an extrusion die to form an extruded article.

Typically the components in the formulation are solid or powdery and flowable.

Typically the method includes adding homogenising means to the formulation in the mixing step so as to disperse the carbon filler homogenously amongst the butyl polymer.

Typically the mixing step includes blending the formulation, eg in an internal mixer, and then dumping it in an open mill mixer and sheeting it off to form a master batch.

Typically the mixing step further includes returning the masterbatch to the open mill mixer, mixing it thoroughly, and then sheeting off a final mix which is then used in the extrusion step.

Typically the accelerants are added when the masterbatch is returned to the open mill mixer.

Typically the masterbatch is cooled, eg in a cooling tunnel and/or dip solution, before being returned to the open mill.

Advantageously the method also includes the step of cutting a blank for forming an inner core of a golf ball from the extruded article after the extrusion step, and the further step of placing the blank in a mould and heating it to a temperature greater than 140° C. to mould the core. Preferably the inner core is moulded at a temperature of greater than 155° C., eg about 160° C.

Preferably the method yet further includes moulding a cover of ionomeric polymer onto the inner core to form the cover of the golf ball, eg by injection moulding.

A rubber compound and golf ball in accordance with this invention may manifest itself in a variety of forms. It will be convenient to hereinafter describe in detail two examples of the invention. It is to be clearly understood however that the specific nature of this description does not supersede the generality of the preceding description.

Several formulations in accordance with the invention were mixed and cured to produce rubber compounds in accordance with the invention. Some example formulations which were moulded into inner cores are described below.

EXAMPLE 1

The composition of the formulation used in Example 1 is shown in the table below.

| INGREDIENT | PHR (parts per hundred of the polymer) |
|---|---|
| CHLOROBUTYL 1066 (butyl polymer) | 100.00 |
| STEARIC ACID | 1.000 |
| MICROWAX (micro-crystalline wax) | 3.000 |
| MAGLITE DE (processing aids) | 0.510 |
| STRUTKOL 40MS | 3.000 |
| N339 C/B (carbon black) | 90.000 |
| BARYTES | 30.000 |
| PROPAR 100 OIL (Paraffinic/napthenic oil) | 10.000 |
| STRUTKOL WB222 (blend of fatty acids) | 3.000 |
| ZINC OXIDE | 3.000 |
| T.M.T.D.S. (tetramethylthiuram disulphide) | 1.000 |
| M.B.T.S. (2,2 dithiobisbenzothiazole) | 2.000 |
| TOTAL | 246.510 |

The term parts per hundred defines the weight of the other components as a percentage of the weight of polymer. Applicant submits that this measure would be well known to persons skilled in the art and need not be described in further detail.

The formulation excluding curing agents and blend of fatty acids is mixed in an internal mixer. The processing aids assist in mixing the carbon black homogenously into the chlorobutyl polymer. The components are largely in the form of flowable solids except for oil which is naturally liquid.

The rubber formulation is then dumped from the internal mixer into an open mill mixer. The rubber which is soft and pliable/formable is then passed between two rollers in the open mill mixer to form sheeting which comprises the master batch. The mixing process is exothermic and as a result of this process the rubber heats above 100° C.

The master batch is then allowed to cool for 24 hrs and thereafter it is returned to the open mill mixer and this warms the mixture up. Further the accelerators are added to the mixture and it is mixed thoroughly. The mix is then passed through the rolls and the final mix is sheeted off in sheet form and permitted to cool in a tray.

Thereafter the rubber is extruded into solid cylindrical rods of approximately 30 mm diameter. The rubber is not yet vulcanised at this time as the vulcanisation process proceeds slowly at the mixing temperatures. These rods are then chopped into blanks by means of transverse slices of the required spacing. The blanks are then placed in a mould for moulding the core of the golf ball.

The blanks are cut slightly larger than the mould so that there is some compressive pressure when they are received in the mould. Any excess material squeezes out of the mould during the moulding process. The rubber is then moulded in the mould by heating to a temperature of about 160° C. in a thermosetting process for a time period of 3 to 7 minutes. During this period vulcanisation eg cross linking takes place.

The inner core can then be removed from the mould. Thereafter a SURLYN cover can be applied to the inner core to produce or yield a finished golf ball product with a dimpled outer surface. This is done by an injection moulding process.

EXAMPLE 2

The formulation used in Example 2 is shown in the table below.

| INGREDIENT | PHR (parts per hundred of the polymer) |
| --- | --- |
| X2 BROMOBUTYL | 100.000 |
| STEARIC ACID | 1.000 |
| MICROWAX (micro-crystalline wax) | 3.000 |
| MAGLITE DE (processing aids) | 0.510 |
| STRUTKOL 40MS | 3.000 |
| N339 C/B (carbon black) | 90.000 |
| KAOLIN HR1 | 50.000 |
| PROPAR 100 OIL (Paraffinic/napthenic oil) | 10.000 |
| STRUTKOL WB222 (blend of fatty acids) | 3.000 |
| ZINC OXIDE | 3.000 |
| T.M.T.D.S. (tetramethylthiuram disulphide) | 1.000 |
| M.B.T.S. (2,2 dithiobisbenzothiazole) | 2.000 |
| TOTAL | 266.510 |

The formulation was used as with Example 1 to produce a core for a golf ball. Balls produced with the formulation in Examples 1 and 2 were then tested on the applicant's indoor golf game.

Further example formulations were made with N220 carbon black and were found to produce even better results. Some of these further examples omitted kaolin and barytes but were otherwise of similar composition to Examples 1 and 2.

The golf ball described above with reference to the examples undergoes an appropriately high energy loss when struck against a wall and consequently the rebound distance is diminished. This is due to the specific halo butyl polymer/carbon black mixture which is used. By contrast a normal golf ball undergoes substantially less energy loss when it rebounds off a wall.

An advantage of the ball described above is that it produces reproducible rebound characteristics off a rebound wall for varying temperature conditions. Further the rebound properties of the ball do not alter as the game is played such that there is no significant increase in rebound after the game has been played for 15 or 20 minutes.

It will of course be realised that the above has been given only by way of illustrative example of the invention and that all such modifications and variations thereto as would be apparent to persons skilled in the art are deemed to fall within the broad scope and ambit of the invention as is herein set forth.

What is claimed is:

1. A golf ball comprising:
a molded resilient inner core made of a rubber compound, said rubber compound comprising a halo-butyl rubber polymer and a carbon black filler; and
a polymeric cover surrounding the inner core, wherein the carbon black filler is present in an amount of between 80% to 100% by weight of the rubber compound.

2. A golf ball according to claim 1, wherein the carbon black comprises 88% to 92% by weight of the total rubber component.

3. A golf ball according to claim 1, where the cover is dimpled.

4. A golf ball according to claim 1, wherein the cover is made of an ionomeric polymer compound.

5. A golf ball according to claim 1, wherein the halo-butyl rubber polymer is either a chlorobutyl rubber polymer or bromobutyl rubber polymer.

6. A golf ball according to claim 1, wherein the carbon black comprises 85% to 95% by weight of the total rubber component.

7. A golf ball according to claim 1, wherein the rubber compound has been vulcanized by a sulphur compound.

8. A golf ball according to claim 7, wherein the sulphur compound is a disulphide compound.

9. A golf ball according to claim 8, wherein the disulphide compound is selected from the group consisting of tetramethylthiuramdisulphide, 2-dithiobisbenzothiazole, and mixtures thereof.

10. A golf ball according to claim 1, wherein the rubber compound has been vulcanised by zinc oxide and at least one disulphide compound.

11. A golf ball according to claim 10, wherein the at least one disulphide compound is selected from the group consisting of tetramethylthiuramdisulphide, 2-dithiobisbenzothiazole, and mixtures thereof.

12. A golf ball according to claim 1, wherein the rubber compound has been vulcanized by a vulcanizing agent selected from the group consisting of zinc oxide, disulphide compound, and mixtures thereof.

13. A golf ball according to claim 1, wherein the rubber compound further comprising a blend of fatty acids.

14. A golf ball according to claim 13, wherein the blend of fatty acids comprises at least stearic acid.

15. A golf ball according to claim 1, wherein the rubber compound further comprising paraffinic oil and/or naphthenic oil.

16. A golf ball according to claim 1, wherein the rubber compound further comprises micro-crystalline wax.

17. A golf ball according to claim 1, wherein the rubber compound further comprises barytes and/or kaolin.

18. A golf ball according to claim 1, wherein the rubber compound further comprises one or more components selected from the group consisting of a blend of fatty acids, stearic acid, paraffinic oil, naphthenic oil, micro-crystalline wax, barytes and kaolin.

19. A golf ball according to claim 5, wherein the rubber compound further comprises one or more components selected from the group consisting of a blend of fatty acids, stearic acid, paraffinic oil, naphthenic oil, micro-crystalline wax, barytes and kaolin.

20. A golf ball according to claim 12, wherein the rubber compound further comprises one or more components selected from the group consisting of a blend of fatty acids, stearic acid, paraffinic oil naphthenic oil, micro-crystalline wax, barytes and kaolin.

21. A golf ball comprising:
a moulded resilient inner core made of a rubber compound, said rubber compound comprising a halo-butyl rubber polymer and a carbon black filler; and
a polymeric cover surrounding the inner core, wherein the rubber compound has been vulcanized by a sulphur compound.

* * * * *